Sept. 17, 1968  N. W. BROUDER  3,401,881
TEMPERATURE-RESPONSIVE FLUID CONTROL SYSTEM AND VALVE THEREFOR
Filed Nov. 2, 1966
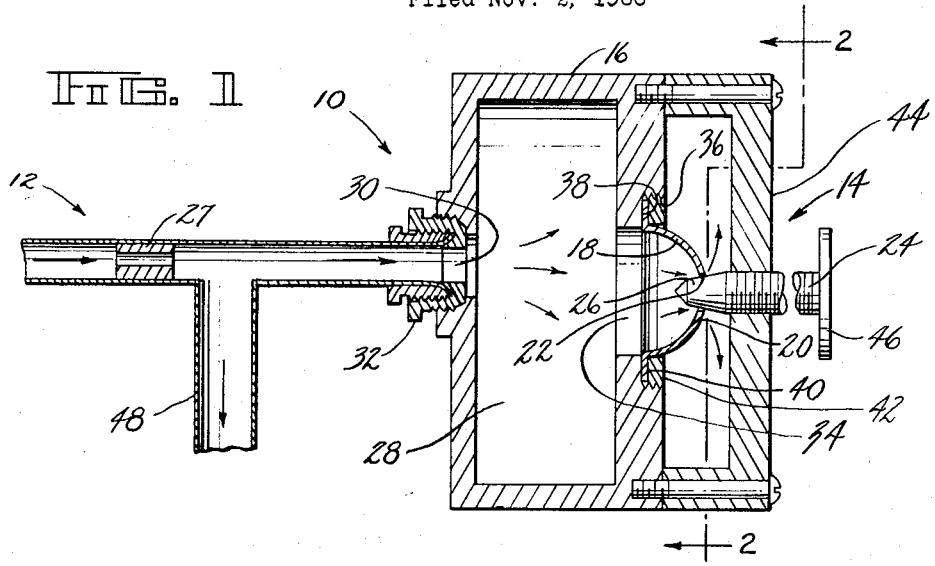
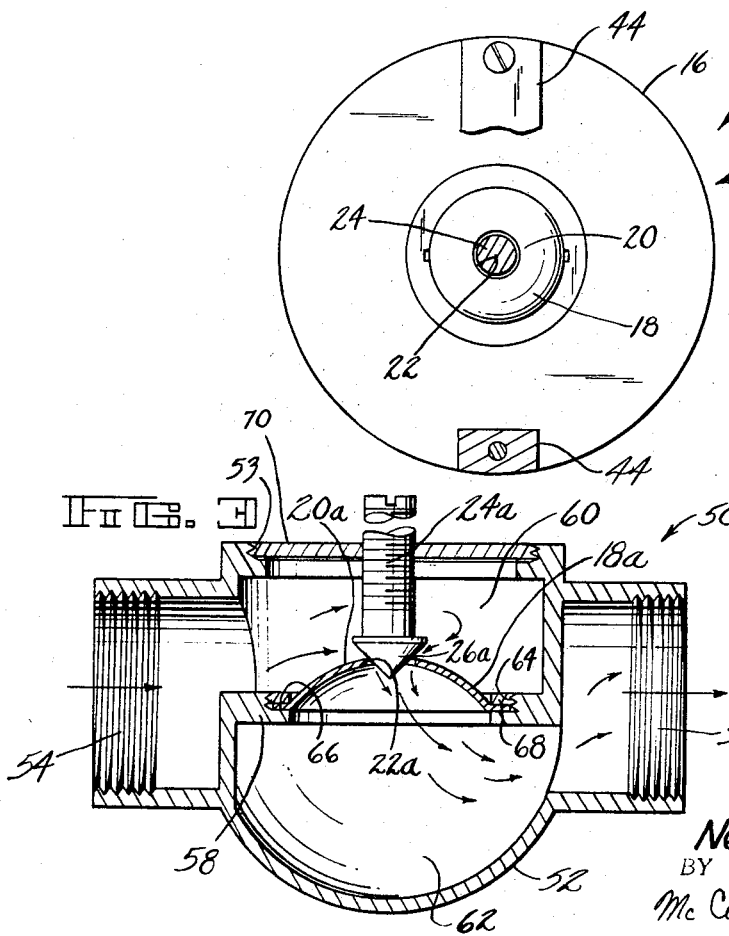
INVENTOR.
Neil W. Brouder
BY
McCormick, Paulding & Huber
ATTORNEYS 3,401,881
TEMPERATURE-RESPONSIVE FLUID CONTROL SYSTEM AND VALVE THEREFOR
Neil W. Brouder, 54 Cedar Ridge Drive,
Glastonbury, Conn. 06033
Filed Nov. 2, 1966, Ser. No. 591,628
13 Claims. (Cl. 236—86)

ABSTRACT OF THE DISCLOSURE

A temperature-responsive fluid control system has a valve which includes a dome-shaped diaphragm with a central orifice. A valve member extends into the orifice and has a cross-sectional shape in the vicinity of the orifice which varies axially thereof. The diaphragm is temperature sensitive so that its central portion moves relative to the valve member to vary the effective orifice area and thereby controls fluid flow therethrough in response to temperature change.

---

This invention relates in general to a fluid control system, and deals more particularly with a temperature-responsive fluid control system and a valve therefor.

The general object of this invention is to provide a fluid control system having an improved means therein for controlling the rate of fluid flow therethrough in response to changes in temperature.

A more particular object of the present invention is to provide an improved pneumatic control system of the aforedescribed character which may, for example, be used as a controller to regulate the flow of a heating medium in response to temperature changes.

Another object of this invention is to provide a temperature-responsive valve adapted for use in a fluid line to regulate the rate of fluid flow therethrough.

A further object of this invention is to provide a valve of the aforedescribed type wherein the action thereof may be readily reversed by altering the relative positions of parts thereof.

A still further object of this invention is to provide a valve of the aforedescribed type of simple and yet durable design and construction which may be manufactured at low cost.

Other objects and advantages of the invention will be apparent from the following description and from the drawing forming a part thereof.

The drawing shows preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Of the drawing:

FIG. 1 is a longitudinal sectional view taken through a portion of a fluid control ssytem embodying the present invention.

FIG. 2 is a transverse sectional view taken along the line 2—2 of FIG. 1.

FIG. 3 is a vertical axial sectional view taken through a fluid control valve and shows another embodiment of the invention.

Turning now to the drawing, and first to FIG. 1, a temperature-responsive fluid control system embodying the invention is illustrated and designated generally by the reference numeral 10. The system 10 generally comprises a conduit or pipe line indicated generally at 12 confining a quantity of flowing fluid and a control valve connected thereto for regulating the rate of fluid flow through the system and indicated generally at 14.

The valve 14 has a hollow housing 16 providing support for an element or diaphragm 18 having a central portion 20 defining an orifice 22 through which the fluid in the system is constrained to flow. Also supported on the housing is a valve member 24 including a part 26 extending into the orifice to diminish the area thereof and tapered along a part of its length so as to have a cross-sectional shape in the vicinity of the orifice which varies in area axially thereof. The diaphragm 18 is a temperature-sensitive type so that its central portion 20 is movable relative to the housing and generally toward or away from the valve member to vary the effective orifice area in response to temperature changes through a range of positions between positions of minimum and maximum fluid flow.

Considering further the valve 14, the housing 16 is generally cylindrical and has a coaxially aligned generally cylindrical chamber 28 therein. The housing is adapted to be connected with the conduit 12 to provide a path of fluid flow to the chamber 28, and for this purpose includes an inlet port 30 internally threaded to receive a conventional threaded tube fitting 32.

Generally opposite the inlet port 30 an opening 34 extends through a wall of the housing. At the outer end of the opening 34 there is formed an internally threaded socket 36 including an annular shoulder 38. In the illustrated embodiment the diaphragm 18 is received in the socket 36 and generally forms a portion of an exterior wall of housing. Preferably, and as shown, the diaphragm is generally dome-shaped and includes a radially outwardly projecting annular base flange 40 which engages the shoulder 38. The orifice 22 has a generally circular cross-section and is preferably generally cylindrical. A ring-shaped retaining nut 42 threadably received in the socket 38 retains the diaphragm 18 in assembly with the housing 16.

Support for the valve member 24 is provided by an elongated generally U-shaped bar 44 fastened to the housing 16 and extending diametrically thereacross so as to bridge the dome-shaped diaphragm. Preferably and as shown, the valve member 24 threadably engages the bar 44 and extends therethrough and includes a part or end portion 26 which extends coaxially into the orifice 22. In the embodiment 10 the end portion 26 is conical, tapering to a smaller diameter while inwardly passing toward the center of the chamber 28. Thus, the valve member 24 may be threadably adjusted toward and away from the diaphragm 18 to vary the effective area of the orifice 22, the effective area being the area between the diaphragm and the valve element. At its outer end the member 24 is provided with an adjustment knob 46 to allow it to be easily turned by hand and which if desired may be suitably calibrated with control unit indicia.

The illustrated fluid control system 10 is one adapted for use as part of a pneumatic temperature control system, such as one used to regulate the flow of a heating medium (not shown) in response to temperature changes in the air surrounding the valve 14. As is conventional in pneumatic controllers, a restriction is provided upstream of the orifice, the restriction in this case being shown at 27 in the conduit 12. Upstream of the restriction the air supply is maintained at a constant pressure, conventionally 15 p.s.i. The chamber 28 which receives air from the conduit 12 therefore serves as a pilot chamber the pressure in which varies with variations in the effective orifice area. Therefore, in response to temperature changes the diaphragm 20 moves toward and away from the valve member 24, thereby varying the effective area of the orifice and accordingly varying the air pressure in the pilot air chamber 28. The air pressure in the pilot chamber is in turn used to operate a control device (not shown) connected with the pilot chamber by a branch conduit 48.

At this point is should be noted that the domed diaphragm 18 is shown to be secured to the housing 16 in an outwardly projecting position so that expansion thereof in response to an increase in temperature causes movement of the central portion 20 generally toward the member 24, thus reducing the size of the orifice 22 and increasing the pressure in the pilot chamber 28. As an alternative to this, the diaphragm may also be assembled with the housing so that the domed-shaped portion extends inwardly or toward the center of the housing. When the valve parts are assembled in this manner, and the valve member 24 properly adjusted, an increase in temperature causing the expansion of the domed-shaped member will cause the diaphragm to move away from the valve member, increasing the effective area of the orifice 18 and decreasing the pressure in the pilot chamber 22. Thus, the action of the control valve 14 may be reversed by the simple expedient of altering the position of the diaphragm with respect to the housing.

Referring now to FIG. 3, this figure shows another valve 50 embodying the present invention for use in a fluid flow system and particularly adapted for regulating the rate liquid flow through the system.

The valve 50 generally comprises a hollow housing 52 generally similar to a conventional T-shaped globe valve casing and includes an upwardly opening port 53 such as the port through which a valve stem normally extends. The valve is adapted for connection in a fluid conduit or pipe line and for this purpose the housing 52 includes an inlet port 54 and an outlet port 56 which are internally threaded to receive conventional threaded piping. In the presently preferred embodiment of the invention, the ports are coaxially aligned to provide a generally longitudinally path of flow through the device. It should be understood, however, that while these openings have been termed "inlet" and "outlet," this has been done to facilitate description of the apparatus, as the construction admits to the flow of fluid in either direction therethrough.

A generally transversely extending partition 58 divides the interior of the housing 52 into a first chamber 60 communicating with the inlet port 54 and a second chamber 62 communicating with the outlet port 56.

The partition 58 has an aperture therein through which fluid is constrained to flow in passing from the inlet port 54 to the outlet port 56. Part of the opening is defined by an upwardly opening internally threaded socket 64. An upwardly facing shoulder 66 at the base of the socket provides a seating surface for an annular base flange on a diaphragm 18a generally similar in all respects to the aforedescribed diaphragm 18. Like the aforedescribed diaphragm 18, the diaphragm 18a is generally domedshaped and includes a central portion 20a defining an orifice 22a which is preferably cylindrical. A ring-shaped retaining nut 68 maintains the diaphragm 14a in assembly with the housing 52.

The port 53 is internally threaded and receives a circular closure or disk 70. A valve member 24a which threadably engages the disk 70 at its center includes a part or end portion 26a which projects into the orifice 22a.

Like the valve member of the previously described embodiment, the end portion 26a of the valve member 24a is conical and is adjustable generally toward and away from the diaphragm 18a by turning the member relative to the housing.

In the illuistrated emobdiment the diaphragm 18a is positioned to reduce or restrict the rate of fluid flow from the inlet port 54 to the outlet port 56 as the temperaure of the fluid increases. It should be evident, however, from the previous discussion that the valve 50 may be employed to increase the rate of fluid flow from the inlet port to the outlet port as the temperature of the fluid increases by the simple expedient of inverting the diaphragm 18a with respect to the housing 52 and adjusting the position of the valve member 24a accordingly.

The invention claimed is:

1. In a fluid control system the combination comprising, means defining a fluid flow path, a diaphragm supported in said flow path and having a portion defining an orifice passing therethrough between opposite sides of said diaphragm and through which orifice the fluid of said flow path is constrained to flow, said diaphragm further being of a temperature sensitive type wherein the displacement of said orifice defining portion from a reference plane through another part of said diaphragm varies with changes in the temperature thereof, a valve member having a part thereof extending into said orifice, said valve member in the vicinity of said orifice having a cross-sectional area which varies axially of said orifice, means for fixing said valve member relative to said reference plane, and means defining a restriction in said flow path upstream of said element.

2. The combination as set forth in claim 1 wherein said orifice has a generally circular cross-section wherein said valve member part is generally conical.

3. The combination as set forth in claim 1 including means for adjustably positioning said valve member relative to said reference plane.

4. The combination as set forth in claim 1 wherein said diaphragm is generally dome-shaped and said orifice defining portion is the central portion thereof.

5. A temperature-responsive valve for varying the rate of flow of fluid through a flow path, said valve comprising a diaphragm adapted to be supported in said flow path and having a portion defining an orifice passing therethrough between opposite sides of said diaphragm and through which said fluid is constrained to flow, said diaphragm further being of a temperature-sensitive type wherein the displacement of said orifice defining portion from a reference plane through another part of said diaphragm varies with changes in the temperature thereof, a valve member having a part extending into said orifice and having a cross-sectional area which varies axially of said orifice, and means for fixing said valve member relative to said reference plane.

6. A temperature-responsive valve as set forth in claim 5 wherein said orifice has a generally circular cross-section and wherein said valve member part is generally conical.

7. A temperature-responsive valve as set forth in claim 5 including means for adjustably positioning said valve member relative to said reference plane.

8. A temperature responsive valve as set forth in claim 5 wherein said diaphragm is generally dome-shaped and said orifice defining portion is the central portion thereof.

9. A temperature-responsive valve as set forth in claim 5 including a housing partially defining at least one chamber for receiving a quantity of fluid and having a port communicating with said chamber and adapted for connection with a conduit providing a path of fluid flow, said diaphragm partially defining said chamber.

10. A temperature-responsive valve as set forth in claim 9 wherein said diaphragm partially defines an exterior wall of said housing.

11. A temperature-responsive valve as set forth in claim 5 including a housing partially defining two chambers, a fluid inlet communicating with one of the said chambers, and a fluid outlet communicating with the other of the said chambers, said diaphragm forming a wall between said two chambers.

12. The combination as set forth in claim 1 wherein said orifice defining portion is the central portion of said diaphragm.

13. A temperature-responsive valve as set forth in claim 5 wherein said orifice defining portion is the central portion of said diaphragm.

References Cited

UNITED STATES PATENTS

| | | | |
|---|---|---|---|
| 894,806 | 8/1908 | Ames | 236—59 |
| 2,199,730 | 5/1940 | Piron | 236—86 |

WILLIAM J. WYE, *Primary Examiner.*